(12) United States Patent  (10) Patent No.: US 9,196,274 B2
Stephan et al.  (45) Date of Patent: Nov. 24, 2015

(54) SLIDER CAVITY FEATURE FOR GIMBAL ATTACHMENT

(71) Applicant: Seagate Technology LLC, Cupertino, CA (US)

(72) Inventors: Joseph Michael Stephan, Eden Prairie, MN (US); Gordon Merle Jones, Fairbault, MN (US); Douglas Hampton Cole, Burnsville, MN (US); Christopher Unger, St. Louis Park, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/107,112

(22) Filed: Dec. 16, 2013

(65) Prior Publication Data

US 2015/0170689 A1  Jun. 18, 2015

(51) Int. Cl.
*G11B 5/48*  (2006.01)

(52) U.S. Cl.
CPC ............... *G11B 5/48* (2013.01); *G11B 5/4826* (2013.01)

(58) Field of Classification Search
USPC .......................................... 360/234.6, 245.4
See application file for complete search history.

(56) References Cited

U.S. PATENT DOCUMENTS

| 5,759,418 | A | * | 6/1998 | Frater et al. ..................... 216/22 |
| 5,786,964 | A | | 7/1998 | Sone et al. |
| 6,330,134 | B2 | * | 12/2001 | Kameyama ................ 360/245.4 |
| 6,700,746 | B1 | | 3/2004 | Brandt et al. |
| 6,934,122 | B2 | | 8/2005 | Boutaghou et al. |
| 7,199,979 | B2 | * | 4/2007 | Walter et al. ............... 360/234.6 |
| 7,209,323 | B2 | | 4/2007 | Boutaghou et al. |
| 7,230,796 | B2 | * | 6/2007 | Olim .......................... 360/234.6 |
| 2003/0035237 | A1 | * | 2/2003 | Lille .......................... 360/77.07 |
| 2005/0157425 | A1 | * | 7/2005 | Walter et al. ............... 360/234.6 |
| 2006/0087768 | A1 | * | 4/2006 | Erpelding et al. ......... 360/234.5 |

* cited by examiner

*Primary Examiner* — Wayne Young
*Assistant Examiner* — Carlos E Garcia
(74) *Attorney, Agent, or Firm* — Hollingsworth Davis, LLC

(57) ABSTRACT

Disclosed is an embodiment of a suspension for a disk drive having a slider configured for bonding with a gimbal using an adhesive. Embodiments of the slider include one or more cavities in a portion of a slider mounting surface of the slider. The one or more cavities are configured for increasing a volume of the adhesive between the slider mounting surface and the gimbal. A method of forming the one or more cavities on the slider mounting surface, and bonding together the gimbal and the slider is disclosed.

20 Claims, 4 Drawing Sheets

SLIDER CAVITY FEATURE FOR GIMBAL ATTACHMENT

SUMMARY

The various embodiments disclosed herein are generally directed to a disk drive suspension having a slider configured for being bonded together, with an adhesive, to a gimbal.

In some embodiments, the slider includes a cavity in a portion of a slider mounting surface of the slider. The cavity is configured to increase a volume of the adhesive between the slider mounting surface and the gimbal. The slider mounting surface and the gimbal are bonded together with the adhesive therebetween. Some embodiments of the cavity are configured to increase a contact area for the adhesive between the slider mounting surface and the gimbal. Certain embodiments of the cavity are configured to facilitate precise positional and volumetric application of the adhesive.

In some embodiments, the slider includes a plurality of cavities in one or more portions of a slider mounting surface of the slider. The cavities are configured to increase a volume of the adhesive between the slider mounting surface and the gimbal. The slider mounting surface and the gimbal are bonded together with the adhesive therebetween. Some embodiments of the plurality of cavities are configured to increase a contact area for the adhesive between the slider mounting surface and the gimbal. Certain embodiments of the cavities are configured to facilitate precise positional or volumetric application of the adhesive.

An embodiment of a method of bonding together a slider and a gimbal includes forming a cavity in a portion of a slider mounting surface of the slider, and configuring the cavity for increasing a volume of the adhesive between the slider mounting surface and the gimbal. After the cavity is formed, the method includes applying the adhesive between the slider mounting surface and the gimbal, and bonding together the slider mounting surface and the gimbal.

The foregoing is not intended to describe each embodiment or every implementation or alternatives of the instant disclosure. The various embodiments of the disclosure are described herein with reference to their illustrations.

DETAILED DESCRIPTION

The following is a detailed description of the various embodiments with reference to the accompanying drawings, wherein like elements are designated by like numerals. It should be clearly understood that there is no intent, implied or otherwise, to limit the disclosure in any form or manner to that illustrated and/or described herein. With the instant disclosure as a guide, modifications of the various embodiments disclosed herein, and alternate and/or additional embodiments may become apparent or obvious to one of ordinary skill in the art. All such embodiments, and modifications thereof, are considered as being within the metes and bounds of the instant disclosure as defined by the appended claims and any and all equivalents thereof.

Figure 1:
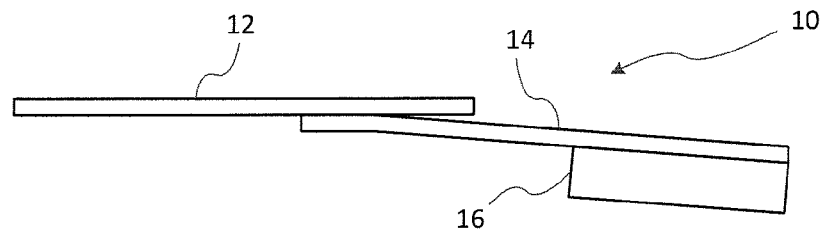
FIG. 1 is a side view of an embodiment of a portion of a suspension.

FIG. 1 is a side view of a portion of an embodiment of a suspension 10 of the type used in a disk drive. In the following, only some of the structural components comprising the suspension 10 are described with reference to the illustrations. As shown, the suspension 10 includes a load beam 12, a flexure 14 attached to the load beam 12, and a slider 16 attached to the flexure 14.

Figure 2A:
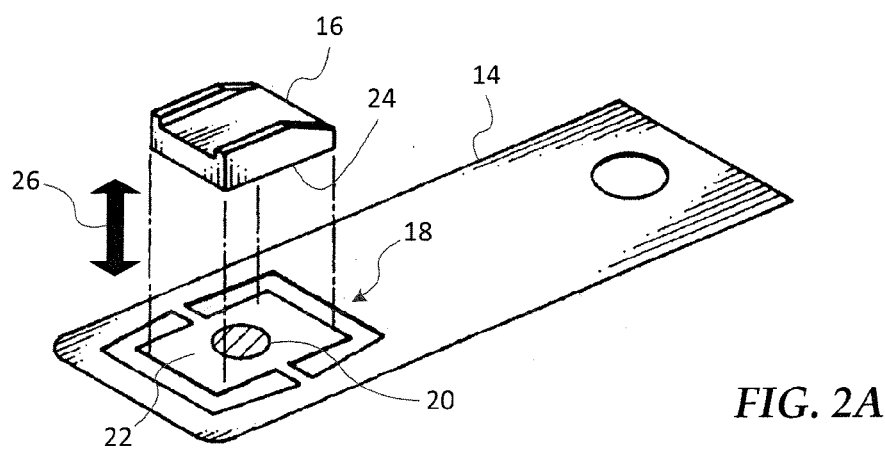
FIG. 2A is a perspective view illustrating embodiments of a flexure and a slider prior to assembly.
Figure 2B:
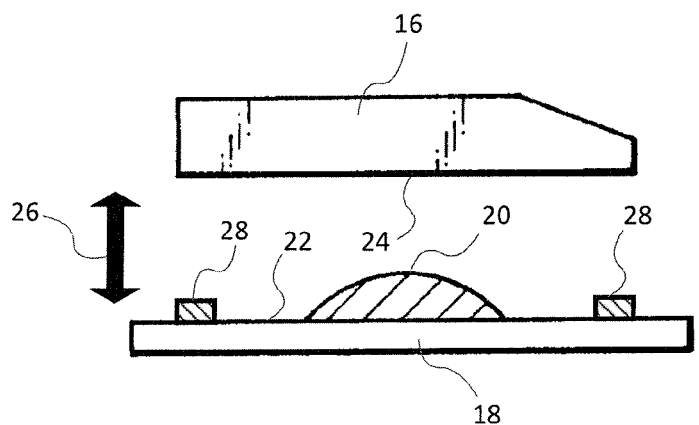
FIG. 2B is a side view of the slider of FIG. 2A and an embodiment of a gimbal prior to assembly.
Figure 2C:
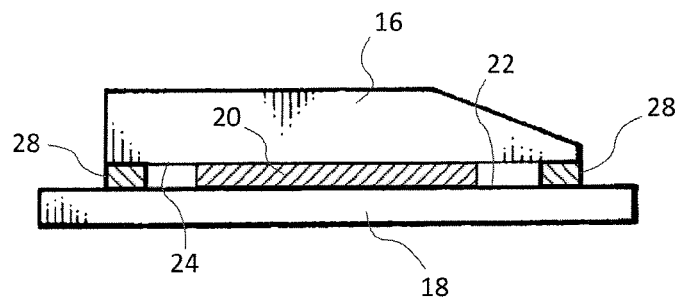
FIG. 2C is a side view of the slider and the gimbal of FIG. 2B after assembly.

FIG. 2A is a perspective view of the flexure 14 and the slider 16 of FIG. 1 prior to assembly. Flexure 14 is illustrated with an embodiment of a gimbal 18 having an adhesive 20 (e.g., a bonding epoxy) on a gimbal mounting surface 22 thereof. The adhesive 20 bonds together (e.g., fixedly attaches) a slider mounting surface 24 of the slider 16 and the gimbal 18. FIGS. 2B and 2C, respectively, are side views of the slider 16 and the gimbal 18 of FIG. 2A prior to and after assembly (e.g., bonding). In some embodiments, the adhesive 20 is placed on a portion of the gimbal mounting surface 22 of the gimbal 18. Alternatively, or in addition, the adhesive 20 can be placed on a portion of the slider mounting surface 24 of the slider 16. After the adhesive 20 has been applied, the slider 16 and the gimbal 18 are aligned, and the gimbal mounting surface 22 and the slider mounting surface 24 are bonded together by translating (e.g., moving) them towards each other as indicated by the directional arrow 26.

In some embodiments the minimum volume of the adhesive 20 required for bonding together the slider 16 and the gimbal 18 is determined by the minimum shear strength requirement therebetween. The maximum volume available for the adhesive 20 can be approximated by considering the adhesive 20 as a cylinder and by assuming the gimbal mounting surface 22 and the slider mounting surface 24 are substantially co-planar. The maximum diameter of the cylinder (e.g., the adhesive 20) can be determined by the width of the slider 16, and the maximum height of the cylinder (e.g., the adhesive 20) can be determined by the distance between the substantially co-planar gimbal mounting surface 22 and the substantially co-planar slider mounting surface 24.

In certain embodiments, the gimbal 18 includes stand-offs 28 extending (e.g., protruding) from the gimbal mounting surface 22, as shown in FIG. 2B. As such, the stand-offs 28 will contact the slider mounting surface 24 when the slider 16 and the gimbal 18 are bonded together as shown in FIG. 2C. Accordingly, the maximum height of the cylinder can be determined by the extent (e.g., the height or the thickness) of the stand-offs 28 as shown in FIG. 2C. As will be apparent, variations in the heights of the stand-offs 28 can have a significant impact on the maximum volume available for the adhesive 20. Thus, a decrease in the height of the stand-offs 28 will reduce the volume available for the adhesive 20. As the volume available for the adhesive 20 decreases, precise positional and volumetric control and containment of the adhesive 20, and in particular the positional and volumetric control and containment of a highly viscous adhesive, becomes challenging.

Figures 3A, 3B:
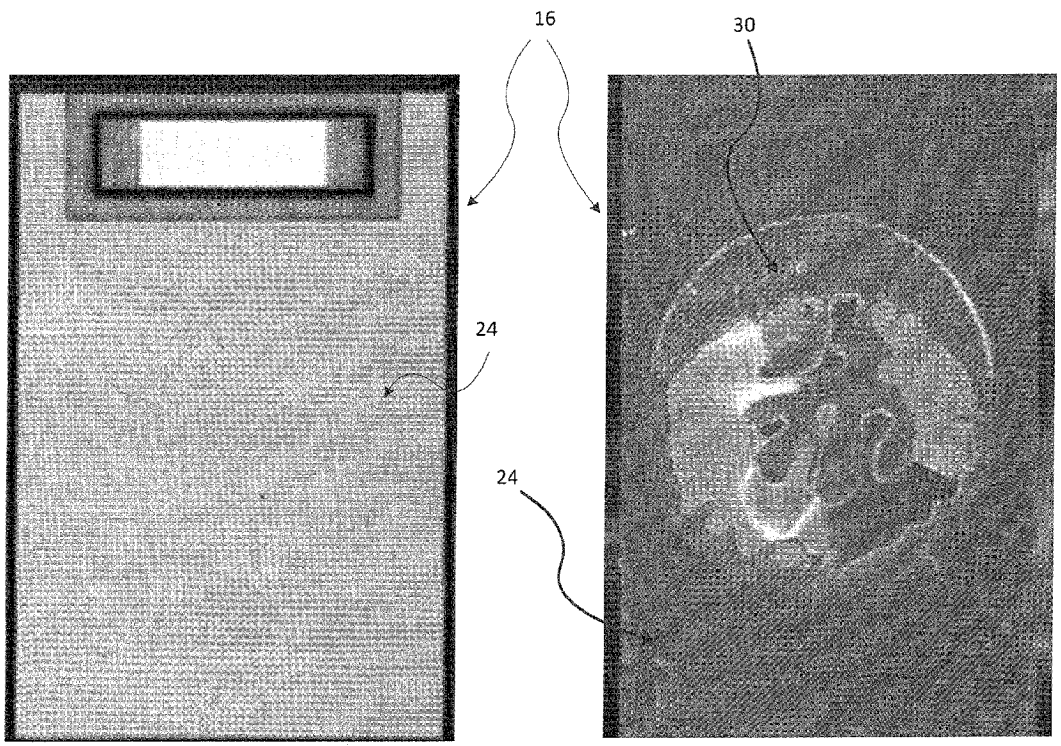
FIG. 3A illustrates an embodiment of a slider mounting surface on a slider.
FIG. 3B illustrates adhesive distribution between the slider of FIG. 3A and an embodiment of a gimbal.

FIG. 3A illustrates an embodiment of a substantially co-planar slider mounting surface 24 of the slider 16; and FIG. 3B illustrates an outline of the adhesive distribution area 30 when the slider mounting surface 24 and the gimbal 18 are bonded together. As shown, the adhesive distribution area 30 between the gimbal 18 and the slider mounting surface 24 has a substantially circular cross-section.

Figure 4A:
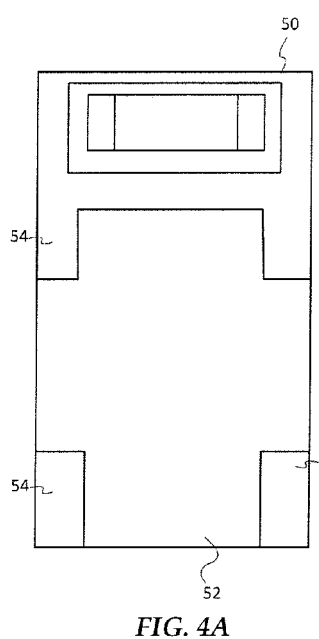
FIGS. 4A-C illustrate an embodiments of a slider.

FIG. 4A illustrates an embodiment of a slider 50 configured for containing an increased volume available for the adhesive used for binding together the slider 50 and an embodiment of a gimbal (not shown). In other words, the slider 50 is configured to increase the volume of the adhesive allowed for binding together the slider 50 and the gimbal. In some embodiments, the slider 50 includes a cavity 52 (e.g., a pocket) on a slider mounting surface 54 thereof. In certain embodiments, the cavity 52 is formed by etching at least a portion of the slider mounting surface 54. In some embodiments, the cavity 52 is formed by a partial etch/mill on at least a portion of the slider mounting surface 54. In certain embodiments, the cavity 52 can be a deep etch/mill adjusted to a predetermined depth after etching at least a portion of the slider mounting surface 54.

It will be readily apparent that the additional volume available for and containable by the adhesive will be determined by the configuration (e.g., shape, size, etc.) of the cavity 52. As such, an extent of the cavity below the slider mounting surface 54 (e.g., depth of the cavity) will be one of the factors in determining the volume available for the adhesive.

In certain embodiments, the cavity 52 can be configured to increase the volume of the adhesive by at least 50% compared to the volume of the adhesive that can be used for a substantially co-planar slider mounting surface. In some embodiments, the cavity 52 can be configured to increase the volume of the adhesive by more than 80% compared to the volume of the adhesive that can be used for a substantially co-planar slider mounting surface. In certain embodiments, the minimum volume and contact area of the adhesive required for bonding together the slider 50 and the gimbal will be dictated by the minimum shear strength requirement therebetween. Accordingly, the minimum shear strength requirement may also dictate the shape and/or the size of the cavity 52. It will be readily apparent, that the cavity 52 also increases the contact area for the adhesive between the slider 50 and the gimbal, and this may further increase adhesion and shear strength. In some embodiments, the cavity 52 facilitates a more tolerant dispensation or application of the adhesive, and in particular the tolerance for the dispensation of a highly viscous adhesive, between the slider 50 and the gimbal.

Figure 4B:
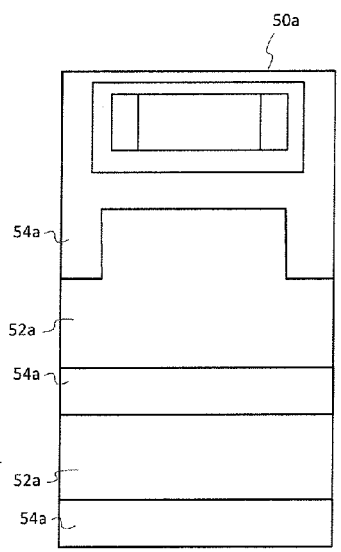
Figure 4C:
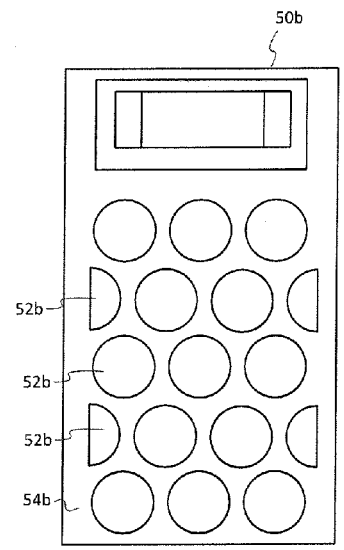

As shown in FIGS. 4A and 4B, certain embodiments of a slider 50a, 50b can include a plurality of cavities 52a, 52b in the slider mounting surfaces 54a, 54b thereof. The plurality of cavities 52a, 52b can be formed in the same or similar manner as that used for forming cavity 52. Embodiments of the gimbal used with slider 50, though not shown, can be substantially similar to the gimbal 18 described elsewhere. Similarly, the cavities can be included on the gimbal instead of or in addition to the cavities on the slider.

As described elsewhere, the maximum volume of the adhesive available for bonding together the gimbal and the slider mounting surface can be approximated by considering the adhesive therebetween as a cylinder. The maximum diameter of the cylinder is dictated by the width of the slider, and the maximum height of the cylinder is dictated by the distance between substantially co-planar gimbal and slider mounting surfaces. In some embodiments, the maximum height of the cylinder is dictated by the stand-offs on the substantially co-planar gimbal mounting surface. It will be apparent to one skilled in the art, that the height of the cylinder also defines the separation between the slider and the gimbal, respectively, with substantially co-planar slider and gimbal mounting surfaces.

By way of a non-limiting example, consider an embodiment of a slider and a gimbal bonded together along their respective mounting surfaces by an adhesive in the form of a cylinder having a diameter of approximately 485 μm. In an embodiment wherein the height of the cylinder of adhesive is approximately 20 μm, the volume of the adhesive between the gimbal and the slider mounting surfaces will be approximately 3.7 nL. If the height of the cylinder of adhesive is decreased to approximately 5 μm, the volume of the adhesive between the gimbal and the slider mounting surfaces will decrease to approximately 0.9 nL. However, if a cavity having a depth of approximately 4 μm is formed in the slider mounting surface, then the height of the cylinder of adhesive increases from approximately 5 μm to approximately 9 μm with a corresponding increase in the volume of the adhesive from approximately 0.9 nL to approximately 1.7 nL. As evidenced by this non-limiting example, the cavity increases the volume of the adhesive between the gimbal and the slider mounting surfaces by approximately 89% while maintaining a separation of approximate 5 μm between the slider and the gimbal.

Figure 5:
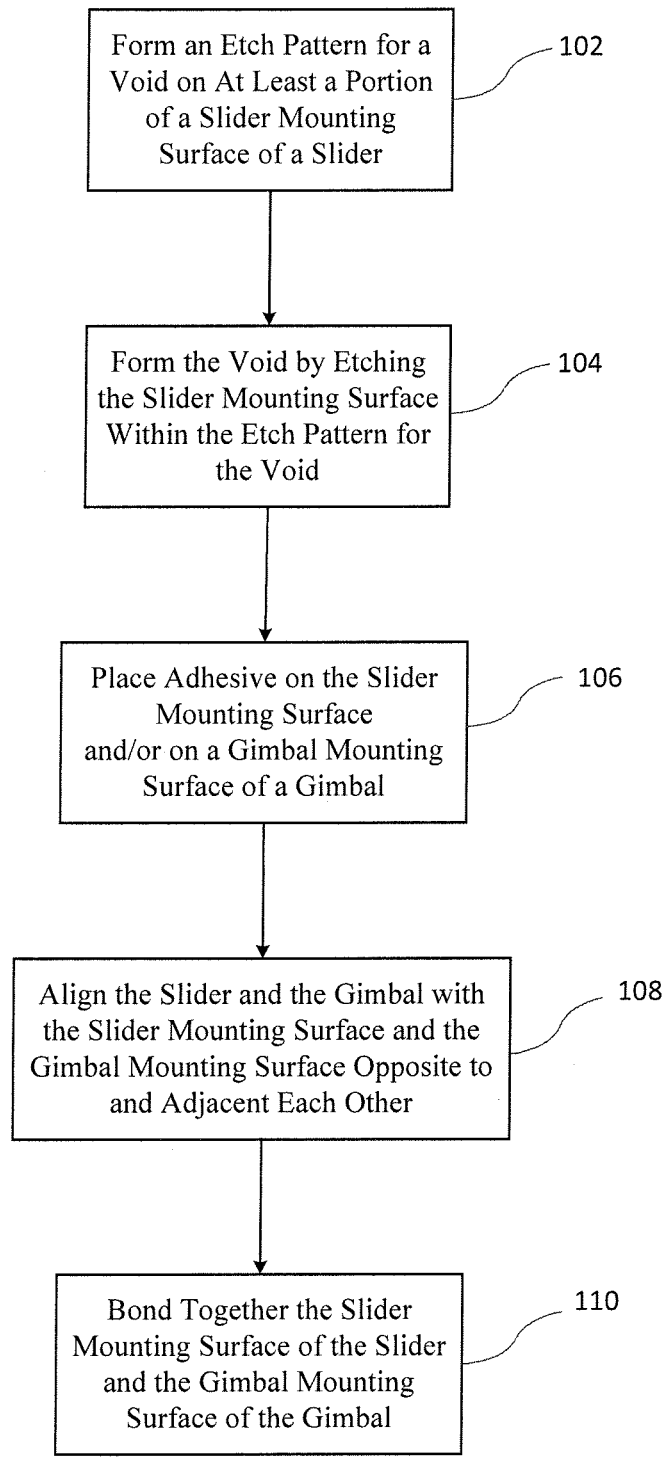
FIG. 5 illustrates an embodiment of a method.

FIG. 5 is a flowchart illustrating a method of bonding together a slider and a gimbal. The method includes forming an etch pattern for the cavity on at least a portion of a slider mounting surface of the slider 102. Then, the cavity is formed by etching the portion of the slider mounting surface within the etch pattern 104. Although not illustrated in FIG. 5, some embodiments of the method include forming at least a portion of the cavity by partially etching the slider mounting surface within the etch pattern. The partially etched slider mounting surface is then deep mill adjusted to form the cavity of a predetermined configuration.

In certain embodiments, the cavity is formed to extend a predetermined depth or distance below the slider mounting surface of the slider. In some embodiments, the cavity is configured to accommodate a predetermined volume of the adhesive used for bonding together the slider and the gimbal. After the cavity has been formed, at least a portion of the adhesive is placed on one or both of the slider mounting surface and the gimbal mounting surface 106. The slider and the gimbal are then aligned against each other with the slider mounting surface and the gimbal mounting surface opposite and adjacent each other 108. Thus, when the adhesive dries or cures, the slider mounting surface and the gimbal mounting surface are bonded together 110. Alternate and/or additional methods of bonding together the slider and the gimbal, as may become apparent to one skilled in the art, are considered as being within the metes and bounds of the instant disclosure.

From the foregoing, it should be apparent to one skilled in the art that the illustrations and the descriptions pertain to the most rudimentary configurations of each of the suspension 10, the load beam 12, the flexure 14, the slider 16 and the gimbal 18. For instance, electrical circuits and wirings have not been shown or described. The load beam 12 and the flexure 14 have been presented as solid structures decavity of any patterned openings, rails and other elements used for enhancing their structural integrity, stability, etc. The slider 16 has been presented as a single integrated component comprising the reader, the writer, electrical contact pads, etc. The configuration of the gimbal 18 is also not limited to that presented herein. Several alternative configurations or designs (e.g., shape, size) of the gimbal 18 are well known in the art. For instance, gimbal 18 is presented decavity of a dimple or protrusion. In view thereof, all additional and/or alternative configurations or designs pertaining to one or more of these components, as would be known or become apparent to one skilled in the art, are considered as being within the metes and bounds of the instant disclosure.

The foregoing detailed description of the various embodiments is not intended to be exhaustive and/or as limiting/restricting the intended spirit and scope of the instant disclosure. While multiple embodiments have been disclosed, modifications thereof and/or alternate/additional embodiments may become apparent or obvious to one of ordinary skill in the art. Any and all such embodiments and features thereof, applied individually or in any combination, are considered as being within the metes and bounds of the instant disclosure.

What is claimed is:

1. An apparatus, comprising:
    a slider, comprising:
        a slider mounting surface; and
        a cavity in a portion of the slider mounting surface;
    a gimbal comprising a planar mounting surface; and
    an adhesive bonding the slider mounting surface and the gimbal mounting surface, the adhesive having a first region in contact with the gimbal mounting surface and a second region proximate a bottom of the cavity where a shape of the first region is substantially the same as a shape of the second region, and where an orientation of the first region is substantially the same as an orientation of the second region;
    wherein, the cavity receives only adhesive and is configured to increase a volume of the adhesive between the slider mounting surface and the gimbal.

2. The apparatus of claim 1, wherein the volume is increased by at least 50% compared to a comparable volume of adhesive used for a substantially co-planar slider mounting surface.

3. The apparatus of claim 2, wherein the volume is increased by more than 80%.

4. The apparatus of claim 1, wherein the cavity is configured to increase a contact area for the adhesive between the slider mounting surface and the gimbal.

5. The apparatus of claim 1, wherein the cavity is configured to facilitate precise positional and volumetric application of the adhesive.

6. The apparatus of claim 1, wherein the gimbal comprises stand-offs that contact the slider mounting surface, wherein the cavity is configured to minimize impacts to the volume of the adhesive due to variations in the stand-offs.

7. The apparatus of claim 1, wherein the cavity extends approximately 4 μm below the slider mounting surface.

8. The apparatus of claim 1, wherein substantially all of the adhesive in the cavity contributes to the shear strength of the bond between the slider mounting surface and the gimbal mounting surface.

9. The apparatus of claim 1, wherein the gimbal mounting surface comprises at least one cavity.

10. An apparatus, comprising:
    a slider, comprising:
        a slider mounting surface; and
        a plurality of cavities in a portion of the slider mounting surface;
    a gimbal comprising a planar mounting surface; and
    an adhesive bonding the slider mounting surface and the gimbal mounting surface;
    wherein, the plurality of cavities receive only adhesive and substantially all of the adhesive in the cavities contributes to shear strength of the bond between the slider mounting surface and the gimbal mounting surface, the cavities are configured to increase a volume of the adhesive between the slider mounting surface and the gimbal, and the adhesive has a substantially uniform cross-sectional area between the cavities and the gimbal mounting surface.

11. The apparatus of claim 10, wherein the volume is increased by at least 50% compared to a comparable volume of adhesive used for a substantially co-planar slider mounting surface.

12. The apparatus of claim 10, wherein the plurality of cavities are configured to increase a contact area for the adhesive between the slider mounting surface and the gimbal.

13. The apparatus of claim 10, wherein the plurality of cavities are configured to facilitate precise positional and volumetric application of the adhesive.

14. The apparatus of claim 10, wherein the gimbal mounting surface comprises a plurality of cavities.

15. A method, comprising:
    forming a cavity in a portion of a slider mounting surface of a slider;
    configuring the cavity for increasing a volume of an adhesive between the slider mounting surface and a planar mounting surface of a gimbal;
    applying the adhesive between the slider mounting surface and the gimbal mounting surface; and
    bonding together the slider mounting surface and the gimbal mounting surface using the adhesive which cures to have a substantially uniform cross-sectional area between the cavity and the gimbal mounting surface, wherein substantially all of the adhesive in the cavity contributes to shear strength of the bond between the slider mounting surface and the gimbal mounting surface.

16. The method of claim 15, comprising increasing the volume by at least 50% compared to a comparable volume of adhesive used for a substantially co-planar slider mounting surface.

17. The method of claim 16, comprising increasing the volume by more than 80%.

18. The method of claim 15, comprising configuring the cavity for increasing a contact area for the adhesive between the slider mounting surface and the gimbal.

19. The method of claim 15, comprising extending the cavity approximately 4 μm below the slider mounting surface.

20. The method of claim 15, comprising forming the cavity by etching the slider mounting surface.

* * * * *